June 16, 1931.  J. J. WHARAM  1,810,195
SPARE WHEEL LOCK
Filed Oct. 19, 1928   3 Sheets-Sheet 1
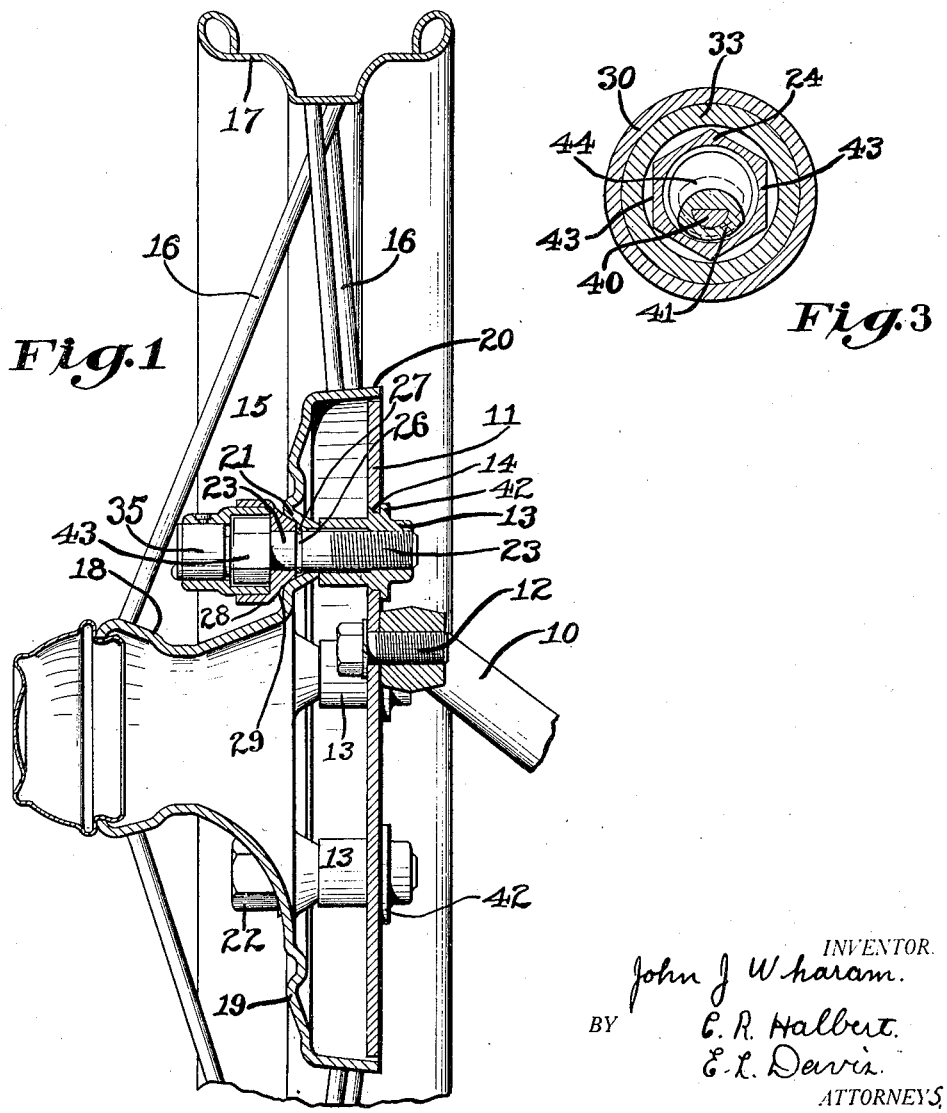
INVENTOR.
John J Wharam.
BY E. R. Halbert.
E. L. Davis.
ATTORNEYS.

June 16, 1931. J. J. WHARAM 1,810,195
SPARE WHEEL LOCK
Filed Oct. 19, 1928 3 Sheets-Sheet 2
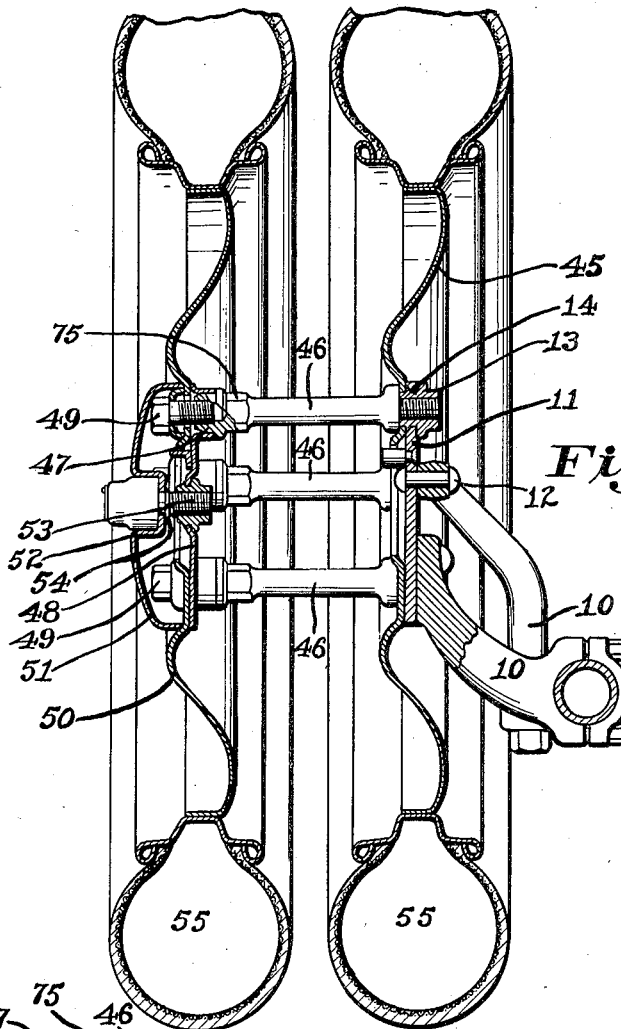
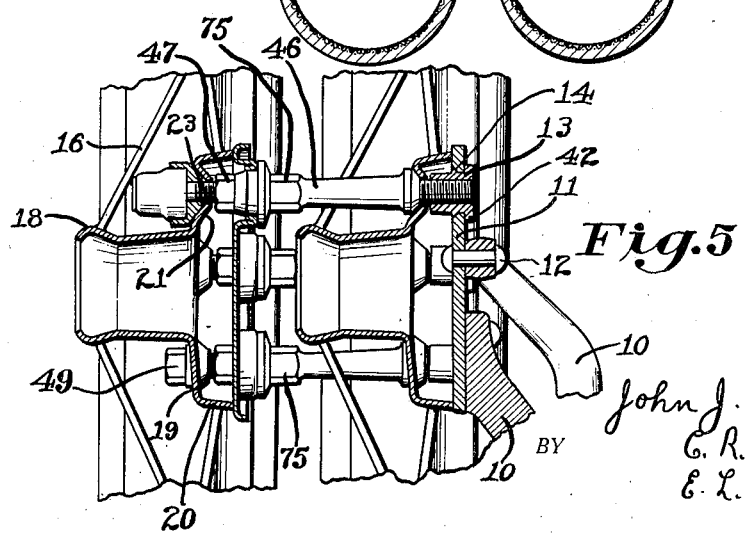
INVENTOR.
John J. Wharam.
E. R. Halbert.
BY E. L. Davis.
ATTORNEYS.

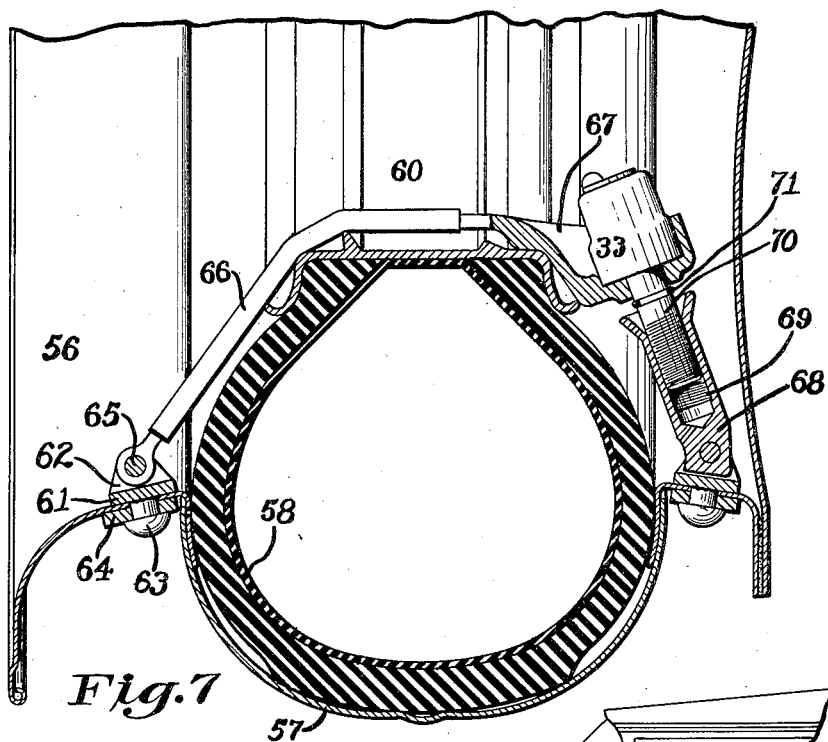
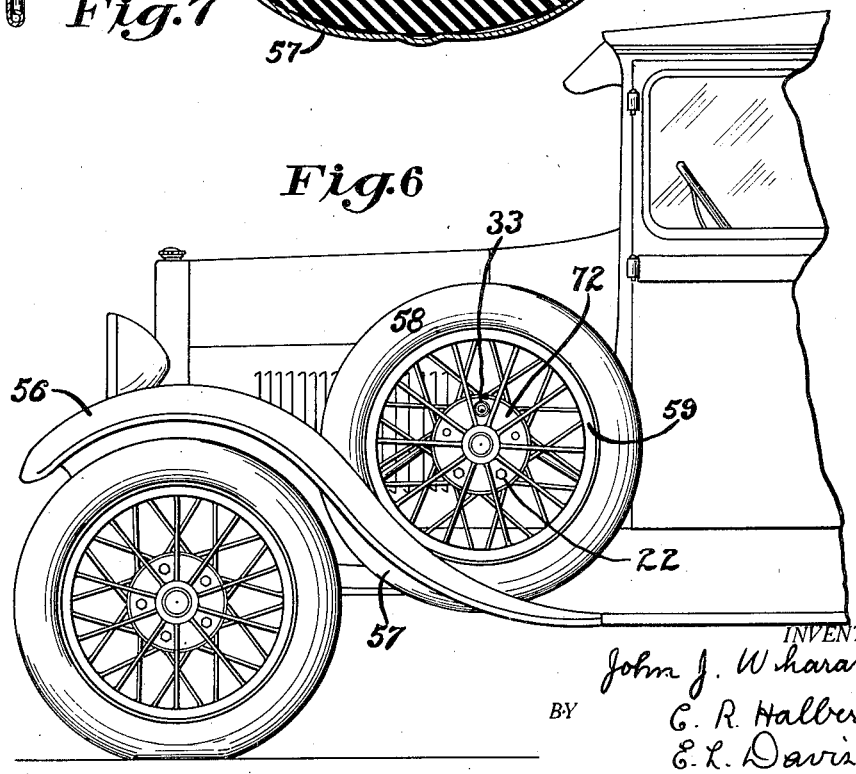

Patented June 16, 1931

1,810,195

UNITED STATES PATENT OFFICE

JOHN J. WHARAM, OF DETROIT, MICHIGAN, ASSIGNOR TO FORD MOTOR COMPANY, OF FORDSON, MICHIGAN, A CORPORATION OF DELAWARE

SPARE WHEEL LOCK

Application filed October 19, 1928. Serial No. 313,404.

The object of my invention is to provide a spare wheel lock of simple, durable and inexpensive construction.

Still a further object of my invention is to provide a spare wheel lock which will prevent the unauthorized removal of the wheel from its mounting.

Still a further object of my invention is to provide a cap or cover for the exposed part of a spare wheel retaining bolt or nut which may be removed from the bolt or nut to permit installation or removal of the bolt or nut and which may be locked onto the bolt or nut in such a way that said cap or cover may be free to rotate on the bolt or nut whereby unauthorized use of a wrench on the cap or cover will neither unscrew the bolt or nut nor do any damage.

Still a further object of my invention is to provide a wheel retaining bolt which will be fully protected from water, mud and similar substances normally associated with automobile wheel locks.

Still a further object of my invention is to provide a wheel retaining bolt, combined with a protecting and wheel hub locating sleeve, and a locking device, each of the said parts being always free for rotation, relative to each other.

Still a further object of my invention is to provide a locking device and wheel hub locating sleeve which together form a closure to prevent access to the wheel retaining bolt for rotating the same.

Still a further object of my invention is to provide a wheel retaining bolt with a wheel hub locating sleeve and a locking device which will form a water and dirt free closure for the head of said bolt, and which will not rattle or prevent installation or removal of said bolt, on account of the hexagonal bolt head being damaged. It is well known that through repeated use, as is encountered in a wheel lock for automobiles, the corners of the retaining nuts or bolt heads become distorted or rounded by reason of the wrench not being applied over the full thickness of the head, or through an excessive strain being placed on the wrench.

I am aware that various devices for preventing unauthorized access to the heads of wheel retaining bolts or nuts have been made, but all of these devices, either are not removable so that the bolt head is accessible or they locate the locking device from the corners of the retaining nuts. Consequently, when the retaining nuts become distorted through use, it becomes impossible to install the locking device, or if sufficient clearance is given to the locking device, to allow for the possible distortion of the nuts, the locking device will rattle.

Still a further object of my invention is to provide a locking device of sturdy and compact form which will be prevented from removal, even though being struck repeated blows with a hammer.

Still a further object of my invention is to adapt the principle thereof to means for locking a spare tire and wheel in a fender well, and to lock two disk or wire wheels to a spare wheel carrier.

With these and other objects in view my invention consists in the arrangement, combination, and construction of the various parts of my improved device, as described in the specification, claimed in the claims, and illustrated in the accompanying drawings, in which Figure 1 is a vertical, central transverse sectional view through a single wire wheel locked on a carrier in accordance with my invention.

Figure 2 is an enlarged vertical contral longitudinal sectional view of my improved wheel lock.

Figure 3 is a sectional view taken on line 3—3 of Figure 2.

Figure 4 shows a view similar to that shown in Figure 1 and illustrates the manner of locking two disk spare wheels on a carrier.

Figure 5 shows a view similar to that shown in Figure 4 and illustrates the manner of locking two wire spare wheels on a carrier.

Figure 6 illustrates the manner of locking a spare wheel and tire in a front fender well, and Figure 7 shows a vertical transverse sectional view cut through the approximate center of the fender well shown in Figure 5, and illustrating the manner of adapting my invention to locking a spare wheel and tire to a fender well.

Referring to the accompanying drawings, I have used the reference numeral 10 to indicate generally a spare wheel carrier arm, commonly associated with an automobile, having a plate 11 fastened thereto by bolts 12. The plate 11 has a plurality of bolt receiving nuts 13 non-rotatably secured therein by any suitable means as by spinning a shoulder on the nut over against one side of the plate as shown at 42 to thereby grip the plate between said shoulder 42 and a second shoulder 14 on said nut 13.

A demountable wire wheel 15 has spokes 16 securing the rim 17 to the hub member 18. This hub member 18 is of the conventional form, having a radial flange 19 terminating in an annular spoke receiving member 20. The flange 19 has a plurality of tapered sockets 21, which cooperate with bolts 22 and my improved locking device to hold the wheel securely to the plate. The detailed construction of the foregoing will not be dealt with here, as it forms no part of my invention and because it is well known to automobile wheel builders.

My improved locking device is adapted to be used instead of one of the bolts 22 and has all the functions thereof with the additional advantage of locking in place. It comprises a bolt member 23 with a head 24 formed integral with its outer end. The head 24 has ordinary hexagonal wrench faces 43 so it may be rotated by means of a socket wrench. The inner end of the bolt 23 is threaded as at 25 to cooperate with any one of the nuts 13, which are used to anchor the wheel 15 on the plate 11. A groove 26 is provided intermediate of the ends of the bolt 23 into which a split retaining ring 27 is set. A wheel hub locating sleeve 28, having a tapered inner face 29 to cooperate with one of the sockets 21 is rotatably secured on the bolt 23 between the head 24 and the retaining ring 26. An annular flange 30 projects outwardly from the sleeve 28 to partially enclose and form a bearing for the locking member which will be described later. In the head 24 is provided an axially disposed bore 31, formed with an enlarged inner end or groove 32. As will be seen in Figure 2, this bore 31 only extends a short distance in the head 24, so as not to materially weaken the bolt 23.

A protecting casing 33 of hollow cylindrical shape is designed to be locked down over the head 24 of the bolt 23 so that the bolt cannot be unscrewed until this casing 33 has been removed. The casing 33 is designed to rotate freely in the sleeve 30, sufficient clearance being allowed between the head 24 and the sleeve 30 so that the inner wall of the casing 33 will always be an appreciable distance away from the corners of the head 24. From the foregoing it will be seen that when, after repeated use, the head 24 becomes distorted it will have no effect whatever upon the reciprocation and free rotation of the casing 33 in the sleeve 30.

The outer end of the casing 33 is provided with an axial bore 34 of a diameter somewhat less than the inside of the inner end of the casing in which a cylinder lock 35 is permanently mounted. Various conventional means may be used for securing this cylinder lock into casing 33, however, I have shown a pin 36 secured into the casing 33 intermediate of the ends of the bore 34 and projecting into a suitable hole 37 in the cylinder lock 35. The head of the pin 36 is secured into the casing 33 by solder 38. The mechanism of the cylinder lock 35 forms no part of my invention and any type of key operated mechanism which has for an object the rotation and the holding from rotation of an eccentrically disposed shank similar to shank 39 shown in Figure 2, will be suitable for use therein.

The shank 39 extends from the cylinder lock 33 into the bore 31 in the head 24. The end of the shank 39, adjacent to the groove 32, is reduced in size and has a semi-circular cross section as shown at 40 in Figure 3. A cam member 41 is riveted to the end 40 of shank 39 and is held from rotation relative thereto by the semi-circular cross section of the shank. As the shank 39 is eccentrically mounted relative to the tumbler lock 25, it may be seen that when the shank 39 is rotated through 180° the cam 41 will assume the position shown in full lines in Figure 3, and also the position shown in dotted lines 44, at the beginning and at the end of the rotation, respectively.

When the cam 41 is in the position shown by the dotted lines 44 the casing 33 may be pulled outwardly by means of the locking key and the head 24 of the locking bolt 23 exposed, so that a socket wrench may be applied thereto and the bolt unscrewed.

From the foregoing it may be seen that when the cam 41 is rotated so that it projects into the groove 26 it is impossible to remove the cap member and thereby be able to loosen the bolt 23. If the sleeve 28 is forcibly rotated it will have no effect on loosening the bolt 23 but will merely rotate around it.

If it is desired to remove the wheel hub 18, a key is inserted in the cylinder 25 and the shank 39 is rotated to thereby rotate the cam 41 out of the groove 26 in head 24. This will permit the casing 33 to slide axially off the head 24 so that the latter may be unscrewed to remove the wheel hub 18. This process is reversed when it is desired to lock the bolt 23 in place.

It will be noted that the casing 33 has a bearing in the flange 30 of sufficient size so that it cannot be removed by being hit a heavy blow with a hammer. The sleeve 28 prevents getting back of the casing 33 with a chisel or other device which would permit the casing to be pried off.

Referring to the construction in Figures 4 and 5 of the drawings, it will be recalled that these views illustrate the manner of locking on two spare disk or wire wheels. In Figure 4, the plate 11 is supported by the spare wheel carrier arm 10 the same as the structures shown in Figure 1. Spare tires 55 are mounted on the disk wheels. The inner disk wheel 45 is secured to the plate 11 by means of combined spacing struts and bolts 46. These struts 46 have one end with an exterior thread and the other end with an interior thread whereby the one end may be extended through the attaching holes in the disk wheel 45 into the nuts 13 in the plate 11 to attach the disk wheel 45 to the plate 11. Hexagonal faces 47 are provided at the outer ends of struts 46 to cooperate with a wrench to screw the strut into the nut 13.

A plate 48 is provided with openings spaced to receive attaching bolts 49 which are designed to pass through the second spare disk wheel 50 and the plate 48 and into the threaded sockets in the outer ends of the struts 46 to secure this wheel 50 in position aligned axially with the wheel 45 in position slightly spaced therefrom so that this wheel 50 may form the second spare wheel. These bolts 49 have their heads covered with a garnish plate 51 which serves to cover up the opening in the center of the disk wheel 50 and is preferably nickel plated on its exterior surface to give a pleasing effect to the central part of the second spare wheel.

A recess 52 is formed in the center of the garnish plate 51 to thereby form a cup having an opening through the bottom thereof which receives the bolt 53. This bolt is provided with a hollow head in all respects similar to the head in the bolt 23 and is locked into the bottom of this cup or recess 52 by a split resilient ring 54 which is just like the ring 27. A protecting casing 33 may be locked down over the head of the bolt 53 in the recess or cup 52 exactly as the casing 33 is locked down over the bolt 23. In this case the cup 52 forms the protection for the lock against unauthorized tampering and entrance of mud, grease or other deleterious substances.

This bolt 53 screws into an appropriately threaded opening in the disk 48 to hold the garnish plate 51 in position. It will be noted that when the bolt 53 is screwed on to lock the garnish plate on and then the casing 33 is installed it will be impossible to remove the spare wheel 50 because the plate 51 will prevent access to the bolts 49 until the plate 51 has been removed which cannot be done without removing the locking casing 33 and the bolt 52.

Flats 75 are provided intermediate of the ends of struts 46 so that a wrench may be applied thereto to hold the struts 46 from turning when bolts 49 are being removed. It is not often that it is necessary to hold the strut 46 as bolt 49 will normally unscrew first. The struts 46 cannot be unscrewed from the nuts 13 when the bolts 49 are screwed down because of the locking action of the bolts 49 against plate 48.

In Figure 5 the method of securing and locking two spare wire wheels are shown. This method is very similar to that employed with the disk wheels previously described and shown in Figure 4. The carrier in general together with the struts 46, plate 48 and locking bolts 49 are almost identical. Due to the projecting of the outer end of the wire wheel hub, the plate 51 is dispensed with and the outer spare wheel locked on by protecting one of the retaining bolts, just as the single wire wheel is protected, as shown in detail by Figure 1. It will be understood that the disk wheels may also be secured by this method if desired, however, the use of the garnish plate 51 presents a neat and clean appearance and would ordinarily be used for this reason.

In case the improved locking device is to be used in connection with the spare wheel mounted in the fender well, a construction similar to that illustrated in Figures 6 and 7 may be used. In this structure, the fender 56 is provided with a semi-cylindrical well 57 designed to receive the lower part of the spare tire 58. This tire is mounted on the wire wheel 59 as shown in Figure 6 or may be mounted on a rim 60 as is illustrated in Figure 7.

A clip 61 is riveted to the fender at either side of the well 57 and is provided with spaced upwardly extending ears 62. The rivets 63 holding these clips 61 on may preferably be riveted down against the washers 64 to prevent damage to the fender 56. A pintle 65 extends between each of the pairs of ears 62 and a link 66 is pivotally mounted on one of the pintles 65. This link 66 is preferably made from material such that a tire thief will be unable to successfully attack it and is provided with a socket 67 at the free end thereof.

A forging 68 is pivotally mounted on the other pintle 65 and this forging is provided with the threaded socket 69 which is designed to receive a bolt 70 which is rotatably but non-slidably mounted in the socket 67 by means of a split resilient ring 71. This bolt has a hollow head exactly similar to the bolts 23 and 63 so that the locking casing 33 may be inserted in the socket 57 over the head of the bolt 70 to lock the latter in place when it has been screwed home into the socket 69 in the forging 68. By referring to Figure 7 it will be seen that when the arm 66 is swung down to position over the inside of the rim 60 and then the bolt 70 is screwed home, then this locking casing 33 will serve to prevent unauthorized removal of the bolt and consequently movement of the link 66 to position whereby the tire 58 and rim 60 can be removed from the fender well 57.

Where wheels 59 are mounted in fender wells 57 in the manner here illustrated, it is quite customary to provide a bracket which extends from the hub 72 of the wheel 59 to some part of the frame of the automobile. Such a bracket would be similar to the bracket 10 illustrated in Figure 1 and would have a plate similar to the plate 11 mounted on the end thereto to be attached to the spare wheel 59. If such a mounting is used the lock casing 33 may be used in combination with a bolt 23 in exactly the same manner as the wheel is shown being locked on in Figure 1.

Some changes may be made in the arrangement, construction and combination of the various parts of my improved device without departing from the spirit of my invention, and it is my intention to cover by my claims such changes as may be reasonably included within the scope thereof.

I claim as my invention.

1. In a device of the character described, a bolt having a recessed head, a sleeve rotatably and non-slidably mounted on said bolt adjacent to the head, a protective casing adapted to be rotatably mounted in said sleeve and to enclose the bolt head, and means for locking the protective casing into said recess to permit rotary movement of the casing relative to the bolt and to prevent axial movement of the casing relative to the bolt.

2. In a device of the character described, a bolt having a recessed head, a sleeve rotatably mounted on said bolt adjacent to the head, a retaining ring co-acting with said bolt to prevent axial movement of the sleeve, a protective casing adapted to be mounted in said sleeve and to enclose the bolt head, and means for locking the protective casing into said recess to permit rotary movement of the casing relative to the bolt and to prevent axial movement of the casing relative to the bolt.

3. In a device of the character described, a bolt having a recessed head, a sleeve mounted on said bolt adjacent to the head, a protective casing rotatably supported in position over the bolt head by said sleeve, said casing being readily removable from said sleeve and bolt head, when in the unlocked position, and means for locking the protective casing in said recess to permit rotary movement of the casing relative to the bolt and sleeve and to prevent axial movement of the casing from the sleeve.

4. In a device of the character described, a bolt having a recessed head, a sleeve mounted on said bolt adjacent to the head, a protective casing rotatably mounted within said sleeve and supported in position over the bolt head thereby, said casing being readily removable from said sleeve and bolt head when in the unlocked position, and means for locking the protective casing in said recess to permit rotary movement of the casing relative to the bolt and sleeve and to prevent axial movement of the casing from the sleeve.

5. In a device of the character described, a bolt having a recessed head, a sleeve rotatably mounted on said bolt adjacent to the head, a protective casing supported in position over the bolt head by said sleeve, said casing being rotatably and slidably mounted within said sleeve, and means for locking the protective casing into said recess to permit rotary movement of the casing relative to the bolt and sleeve and to prevent axial movement of the casing relative to the sleeve.

6. In a device of the character described, a bolt having a recessed head, a sleeve rotatably and non-slidably mounted on said bolt adjacent to the head, a protective casing adapted to be rotatably mounted in said sleeve to enclose said head, a cylinder type lock disposed in said casing, and a cam operable by said lock so as to be moved radially into said recess to thereby permit rotary movement of the casing relative to the bolt and prevent axial movement of the casing relative to the bolt.

7. In a device of the character described, a bolt having a recessed head, an annular internal groove formed in said recess, a sleeve rotatably and non-slidably mounted on said bolt adjacent to said head, a protective casing adapted to be rotatably mounted in said sleeve and to enclose the bolt head, a cylinder lock disposed in said casing, a shaft extending from said lock into said recess, and a cam disposed on said shaft in position adjacent to said groove, said cam being operable by said lock so as to be moved radially into said groove to thereby permit rotary movement of the casing relative to the bolt and to prevent axial movement of the casing relative to the bolt.

October 15, 1928.

JOHN J. WHARAM.